Oct. 31, 1939.　　C. W. LEGUILLON ET AL　　2,177,898
APPARATUS FOR OPERATING UPON ARTICLES
Filed Sept. 9, 1937　　4 Sheets-Sheet 1

Inventors
Charles W. Leguillon
Otto F. Homeier
By Willis F. Avery
Atty

Oct. 31, 1939.    C. W. LEGUILLON ET AL    2,177,898
APPARATUS FOR OPERATING UPON ARTICLES
Filed Sept. 9, 1937    4 Sheets-Sheet 2
Fig.2
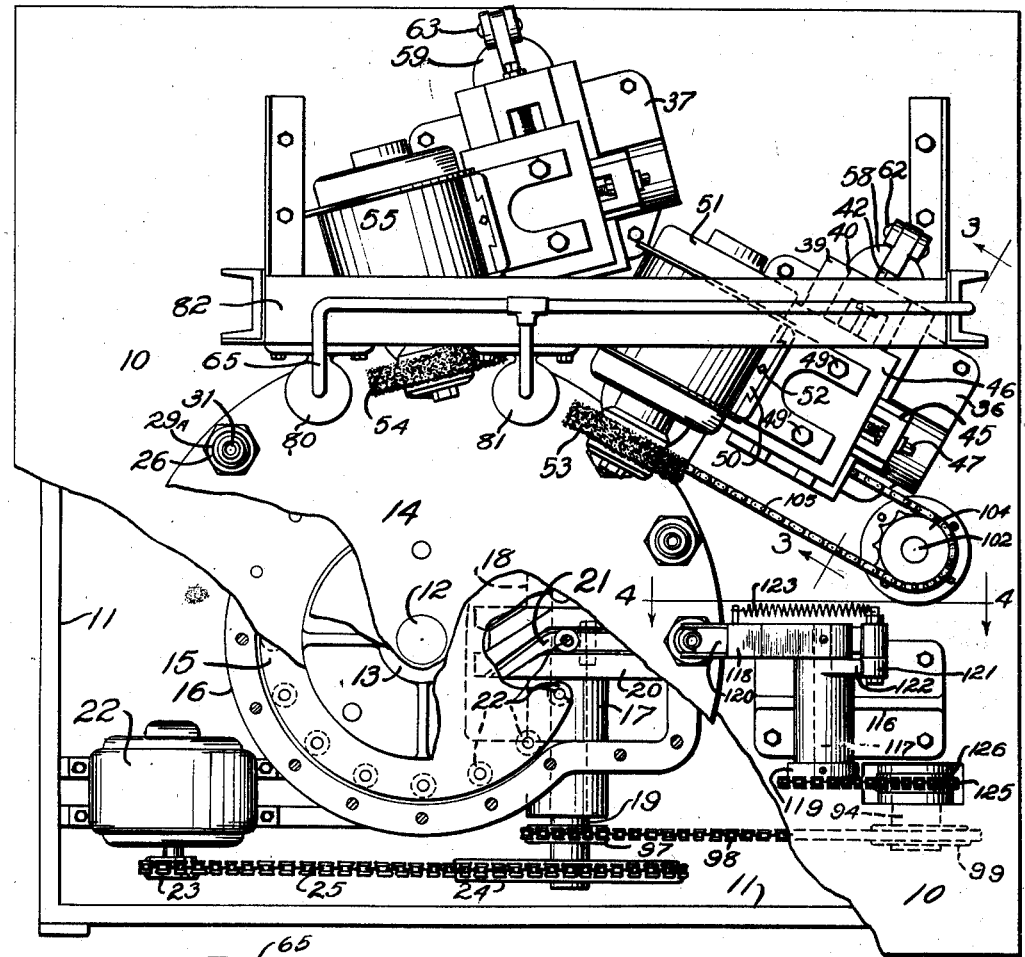
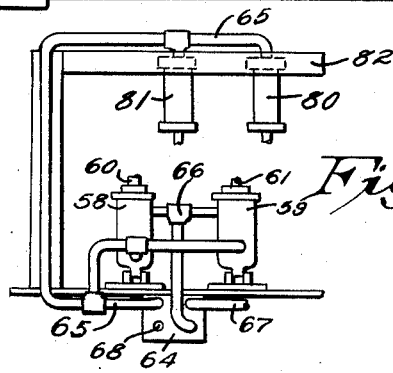
Fig.5
Inventors
Charles W. Leguillon
Otto F. Homeier
By Willis F. Avery
Att'y

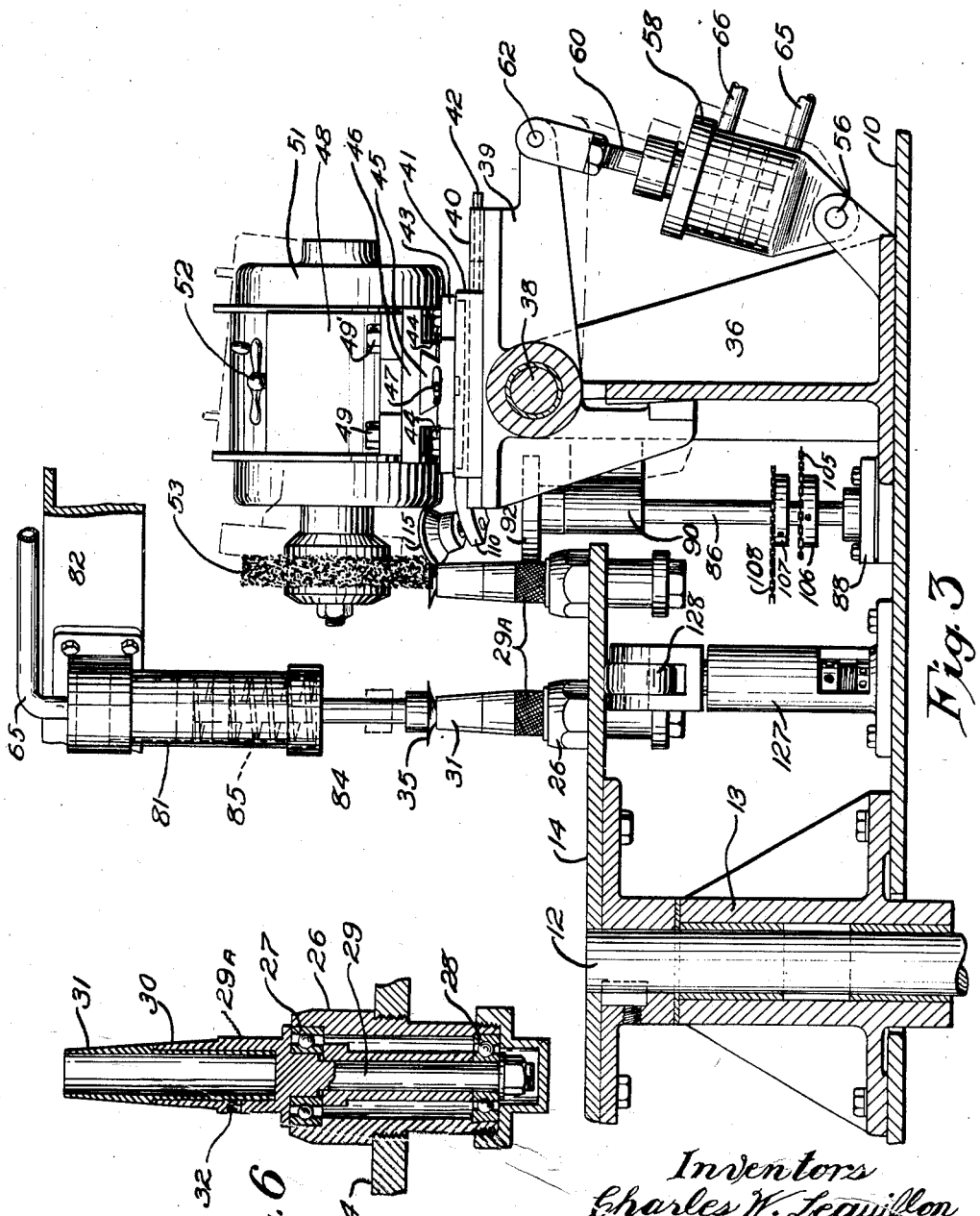

Oct. 31, 1939.   C. W. LEGUILLON ET AL   2,177,898
APPARATUS FOR OPERATING UPON ARTICLES
Filed Sept. 9, 1937   4 Sheets-Sheet 4

Patented Oct. 31, 1939

2,177,898

UNITED STATES PATENT OFFICE 2,177,898

APPARATUS FOR OPERATING UPON ARTICLES

Charles W. Leguillon and Otto F. Homeier, Akron, Ohio, assignors to The B. F. Goodrich Company, New York, N. Y., a corporation of New York Application September 9, 1937, Serial No. 163,104

5 Claims. (Cl. 15—21)

This invention relates to apparatus for operating upon articles, and is especially useful for trimming and buffing the surface of rubber valve stems before they are vulcanized to inner tubes.

The principal objects of the invention are to provide uniformity of product, facility of performance, accuracy of positioning of the articles with relation to the buffing wheels, automatic ejectment of the finished articles, positive seating of the articles in the machine, and adjustability of the apparatus to articles of different form.

These and other objects will appear from the following description and the accompanying drawings.

Of the drawings:

Fig. 2 is a plan view of the same with parts broken away and parts shown in section to show the driving mechanism.

Fig. 3 is a cross-sectional elevation, taken on line 3—3 of Fig. 2, parts being broken away and parts shown in section.

Fig. 5 is a diagrammatic view showing the pipe connections to the fluid cylinders.

Fig. 6 is an axial cross-sectional view of one of the spindles.

Figure 1:
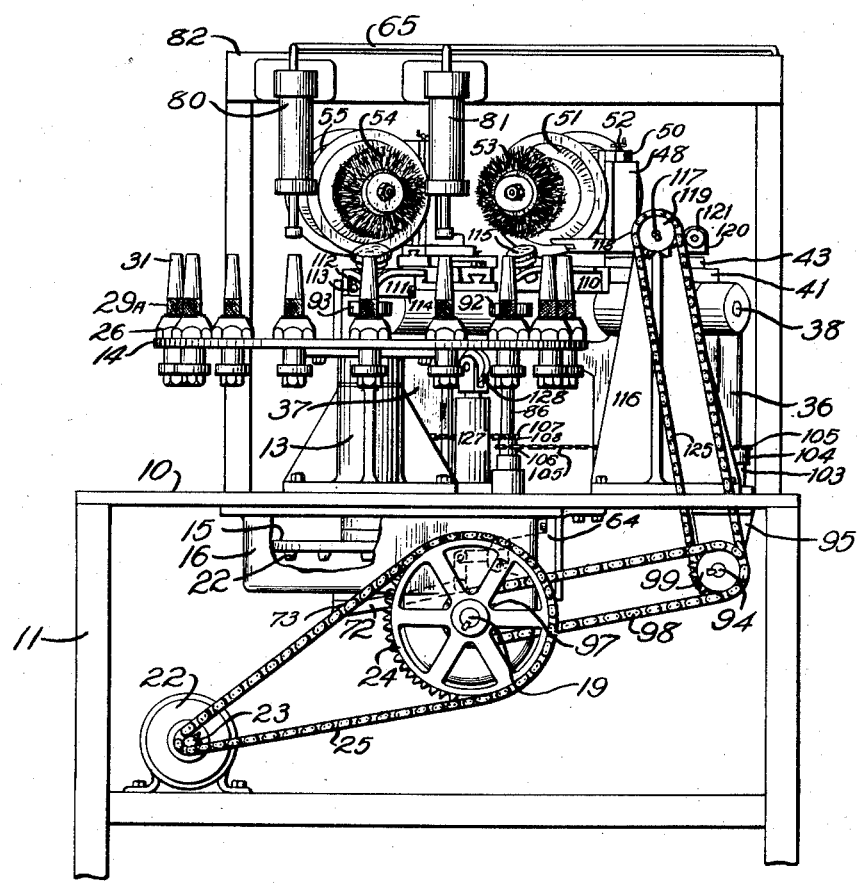
Fig. 1 is a front elevation of the apparatus in its preferred form.

Referring to the drawings, the numeral 10 designates a platform mounted on legs 11. A vertically disposed shaft 12 (see Figs. 2 and 3) extends through a bearing 13 in which it is journaled to rotate and has a circular turn table 14 fixed to its upper extremity, and a crown pin gear 15 fixed to its lower extremity. The pin gear 15 is enclosed by a housing 16, which is formed with bearings 17, 18 in which a horizontal shaft 19 is journaled. A peripherally grooved cam 20 is fixed to shaft 19 with its groove 21 in position to engage roller pins 22 equally spaced on the crown gear. The groove 21 is in one general plane of rotation throughout the greater part of its extent and terminates at opposite margins of the cam in a helical course throughout the remainder of the circumference of the cam, and the cam being equal in width to the circumferential pitch of the pins, the arrangement being such that when the shaft 19 is rotated uniformly the crown gear will be held stationary throughout 310 degrees of rotation of the cam, and during the remainder of one rotation, the crown gear will be moved through an angle subtending the circular pitch of the crown gear.

For rotating the crown gear, an electric motor 22 is mounted on the frame of the machine and drives the shaft 19 through sprockets 23 on the motor shaft, sprocket 24 fixed to shaft 19, and a chain 25.

Equally spaced about the circumference of the turntable 14 are a series of vertically disposed bushings 26 (see Fig. 5) fixed thereto and provided with ball races 27, 28 in which spindles 29 are mounted for rotation on vertical axes. Each spindle is formed with a socket 30 at its upper end in which work holding chucks 31 are removably held by set screws 32. The chucks may be changed to accommodate articles of different shapes and dimensions. In the embodiment of the invention chosen for illustration the articles are soft rubber valve stems 33, each formed with a shank 34 which may be inserted in the chuck, and a flange 35 which it is desired to buff. The valve stems are inserted in the chucks by hand.

The mechanism for supporting, adjusting and driving the buffing wheels is mounted on a pair of similar brackets 36, 37, fixed to the platform 10. The mechanism mounted on bracket 36 is as follows: The bracket 36 is bifurcated and its arms are bored to provide aligned bearings for a rock shaft 38 horizontally disposed substantially tangential of the turntable. A saddle 39 machined to provide a dove-tailed guide 40 on its upper face is fixed to the rock-shaft 38. A table 41 is fitted to slide on the dove-tail 40 at right angles to the shaft 38 and is adjustable therealong by means of a lead screw 42 engaging a threaded lug on the table. A swivel plate 43 is rotatably mounted on the table by means of a central dowel (not shown) and is clamped to the table in any desired position by bolts 44, 44'. The swivel plate 43 is formed with a dove-tail 45 on its upper face, upon which a tool slide 46 is slidably mounted. An adjusting screw 47 is used to adjust the tool slide along the swivel plate. An angle plate 48 is fixed to the tool slide by bolts 49, 49'. The vertical face of the angle plate is formed with a dove-tail guideway in which a dove-tail 50 formed on an electric motor 51 is adapted to slide vertically, an adjusting screw 52 being provided for making such adjustment. The arrangement is such that the motor 51 may be adjusted in any direction on the saddle 39.

The motor spindle carries a scratch brush 53 which is mounted over the path of the spindles 29. By a similar arrangement, a second scratch brush 54 is driven by a motor 55 mounted on bracket 37.

Figure 4:
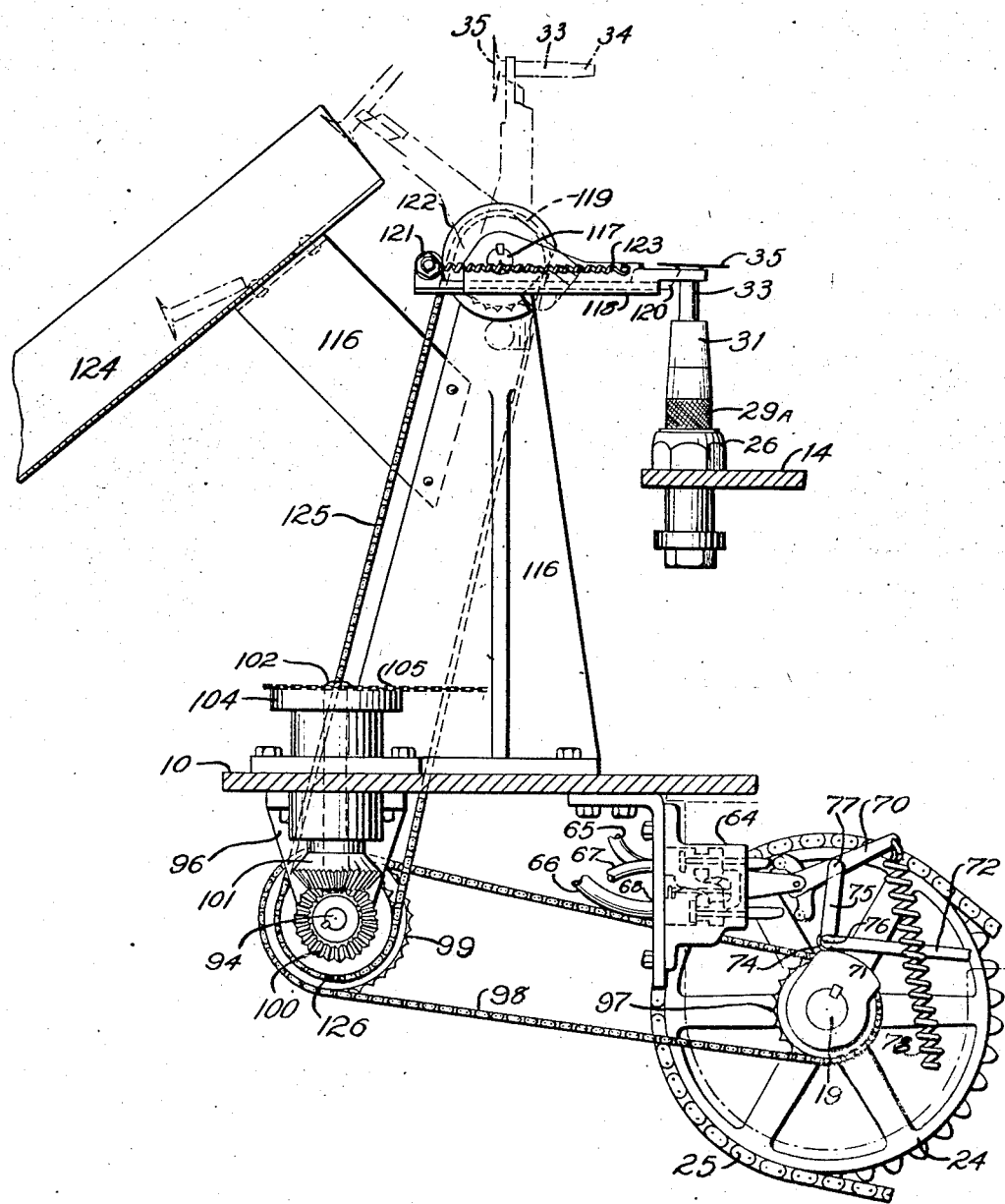
Fig. 4 is a detail sectional elevation, taken on line 4—4 of Fig. 2, parts being broken away.

Pivotally mounted as at 56, 57 on brackets 36, 37, respectively are a pair of double acting fluid pressure cylinders 58, 59, the piston rods 60, 61, of which are pivoted at 62, 63 respectively to the saddles, such as 39, which support the motors for rocking movement. The cylinders act to rock the motors in unison and for this purpose, a four way valve 64 is connected by a branched pipe 65 from the valve to their lower ports, and by a branched pipe 66 to their upper ports. The valve 64 also connects to a compressed air line 67 and an exhaust opening 68. This valve is of the standard poppet valve type and is operated by a rock-lever 70, (see Fig. 4) pivoted thereon. A cam 71 fixed to shaft 19, operates the valve in timed relation to the movements of the turntable. For this purpose a lever 72 is pivoted at 73 on the housing 16 and has its free end bifurcated to straddle a cam roller 74 and a pair of links 75, 75′, all pivoted on a pin 76 fixed to its bifurcated portion. Links 75, 75′ are pivoted at 77 to valve lever 70. A tension coil spring 78 has one end connected to lever 70 and the other to a fixed bracket 79 on housing 16. The arrangement is such that rotation of shaft 19 reverses the valve to rock the scratch brushes toward and from the work.

To assure proper seating of the articles in their chucks, a pair of single acting air cylinders 80, 81 are fixed vertically in alignment with two of the work-holding spindles on a frame 82 supported rigidly from the platform 10. Their piston rods 83, 84 are formed with enlarged ends for engaging the work. These rods are normally held in raised position by coil springs, such as 85 (see Fig. 3). The upper ends of the cylinders are connected to pipe 65 leading to valve 64, the arrangement being such that during a dwell of the turntable, the pistons will be advanced against the article in the chucks in line therewith coincident with the lowering of the scratch brushes into contact with the work at succeeding stations, and will be retracted before the next indexing movement of the turntable.

For the purpose of rotating the work at the buffing stations, a pair of vertically disposed shafts 86, 87 are rotatably mounted in step-bearings 88, 89 fixed to the platform 10 and in bearings 90, 91 attached to brackets 36, 37 respectively. These shafts have pulleys 92, 93 on their upper extremities and these pulleys, which have soft rubber peripheral faces are adapted to contact with the knurled bodies 29ª of the spindles at the buffing stations to rotate the same during the buffing operations. For driving the shafts 86, 87 a horizontal countershaft 94 is journaled in bearings 95, 96, below the platform 10 and is driven by a sprocket 97 on shaft 19 through a chain 98 to a sprocket 99 fixed on shaft 94. A bevel gear 100 is fixed to shaft 94. A second bevel gear 101 meshes therewith and is fixed to a vertical shaft 102 extending through the platform 10 and journaled in a bearing 103 fixed to the platform. A sprocket 104 is fixed to shaft 102 and drives shaft 86 through a chain 105 and sprocket 106 fixed to shaft 86. A sprocket 107 fixed to shaft 86 drives shaft 87 through a chain 108 and a sprocket 109 fixed to shaft 87. Pulleys 92 and 93 are rotated continuously and drive the spindles in succession as the spindles are at the buffing stations.

To support the overhanging flanges of the valve stems or other articles to be buffed at the buffing stations a pair of brackets 110, 111 are mounted on brackets 36, 37 respectively, limited adjustment thereon being provided by slots 112 and bolts 113 passing therethrough at one end of the brackets, the other end being pivoted about the bolt 114. Each bracket is provided with a stud on which is angularly journaled a rotatable disc 115 the face of which is made of wear resisting material, such as Stellite. The discs are adjusted to such a position as to underlie and support the flanges of the valve stems against the pressure of the scratch-brushes.

To provide for removal of the finished articles, a bracket 116 (see Fig. 4) is mounted on the platform 10 and adjacent the rim of the turntable. A shaft 117 is horizontally journaled therein and has an arm 118 fixed to one of its extremities, and a sprocket 119 on the other. The arm 118 is bifurcated at its unattached extremity to provide a pair of fingers adapted to straddle the neck of a valve stem located in a spindle chuck at one of the stations, and by contact with the flange base of the valve stem to lift it from the chuck. The arm 118 is also formed with a guide way longitudinally thereof, and a plunger 120 is slidably mounted therein. The plunger carries a roller 121 adapted to engage a stationary cam 122 fixed to the bracket 116, and a tension coil spring 123 is tensioned between the plunger 120 and the arm 118. A chute 124 is supported by the bracket 116 in position to receive the valve stems discharged from the arm. The cam 122 is so formed that as the arm 118 is rotated in a counter clockwise direction, the plunger 120 is held back during the greater part of the arm movement, but as the arm reaches a position near the end of the chute with a valve stem frictionally held between its fingers because of the resilience of the valve stem, the roller 121 will drop into a depressed portion of the cam and the spring 123 will force the plunger 120 against the valve stem to discharge it into the chute. A chain 125 drives the shaft 117 from the shaft 94 by means of a sprocket 126 on shaft 94 and the sprocket 119 on shaft 117.

To assist in supporting the turntable in the region where it is subjected to pressure of the scratch brushes and the seating plungers, one or more screw jacks 127 (see Fig. 3) may be mounted on the platform 10 and provided with rollers 128 for engaging the lower face of the turntable.

The operation of the device is as follows: The motor 22 is run continuously. The turntable 14 is rotated thereby intermittently so as to permit the spindles carried thereby to dwell at successive operating stations between movements. The operator places the valve stems or other articles in the spindle chucks. As each spindle dwells beneath the cylinder 80, the plunger thereof descends and seats the article in the chuck, as the spindle moves to the next station it engages the drive pulley 93 which causes it to rotate at that station while the valve stem flange is supported by the rotatable disc and the upper face of the flange is buffed by the rotation of the scratch brush 54. At the next station, under the cylinder 81 the plunger 84 descends to again seat the valve which may have become loosened in its chuck. At the following station, a second buffing operation takes place, the scratch brush 53 being adjusted to cover another portion of the face. At one of the succeeding stations the valve stem is ejected by the arm 118.

While the invention has been illustrated in its preferred form, various changes in construction may be made without departing from the scope of the invention.

We claim:

1. Apparatus for buffing valve stems comprising a pliable rubber flange, said apparatus comprising a rotatable spindle socket for receiving and frictionally holding the neck of the valve stem leaving the pliable flange thereof exposed, a freely rotatable supporting disc arranged and adapted for engaging under the flange of the valve stem to support the same, and rotatable buffing means positioned to engage the face of the disc and that part of the flange extending thereover to buff the exposed face of the flange radially outwardly to its extreme edge.

2. Apparatus as defined in claim 1 in which the supporting disc is journaled at an angle to the plane of the valve stem flange and has an article supporting face inclined to the axis of the valve stem.

3. Apparatus for buffing a valve stem comprising a neck portion and a pliable flange therefor, said apparatus comprising buffing means, means for supporting the valve stem for free rotation with its flange projecting radially therefrom, and a rotatable support arranged and adapted for engaging under the pliable flange and supporting it to its extreme edge against the buffing means.

4. Apparatus for buffing a valve stem comprising a neck portion and a pliable flange therefor, said apparatus comprising buffing means, means for supporting the valve stem for free rotation with its flange projecting radially therefrom, and a rotatable support arranged and adapted for engaging under the pliable flange and supporting it to its extreme edge against the buffing means while progressively deflecting the flange toward the buffing means.

5. Apparatus for buffing a valve stem comprising a neck portion and a pliable rubber flange, said apparatus comprising a socket adapted frictionally to engage the neck of the valve stem leaving the pliable flange exposed, means for buffing the exposed surface of the flange, a freely movable surface arranged and adapted for supporting the pliable flange during the buffing operation, and a forked arm engageable under the flange of the valve stem to strip the valve stem from the socket.

CHARLES W. LEGUILLON.
OTTO F. HOMEIER.